United States Patent [19]

Powell et al.

[11] Patent Number: 5,001,866
[45] Date of Patent: Mar. 26, 1991

[54] GASKET ASSEMBLY

[75] Inventors: Anthony D. Powell, Lima; William A. Thompson, Rochester, both of N.Y.

[73] Assignee: MDT Corporation, Torrance, Calif.

[21] Appl. No.: 356,134

[22] Filed: May 24, 1989

[51] Int. Cl.$^5$ ............................................. E06B 7/16
[52] U.S. Cl. ...................................... 49/477; 49/485; 49/493
[58] Field of Search ................ 49/477, 485, 493, 498, 49/506

[56] References Cited

U.S. PATENT DOCUMENTS

| 1,877,448 | 9/1932 | Fitzgerald | 49/493 |
| 2,778,072 | 1/1957 | Palisca | 49/485 |
| 3,077,010 | 2/1963 | Philbrick, Jr. | 49/493 |
| 3,311,042 | 3/1967 | Severson | 49/477 |
| 3,339,785 | 9/1967 | Nugent | 49/477 |
| 3,371,986 | 3/1968 | Brown | 49/477 |
| 3,491,825 | 1/1970 | Peterson et al. | 49/477 |
| 3,694,962 | 10/1972 | McDonald et al. | |
| 3,796,006 | 3/1974 | Dixon | 49/498 X |

FOREIGN PATENT DOCUMENTS

| 2103880 | 8/1971 | Fed. Rep. of Germany | 49/485 |
| 331981 | 7/1930 | United Kingdom | 49/485 |
| 1290340 | 9/1972 | United Kingdom | 49/485 |
| 1547161 | 6/1979 | United Kingdom | 49/493 |
| 2067637 | 7/1981 | United Kingdom | 49/477 |

Primary Examiner—Gary L. Smith
Assistant Examiner—Michael J. Milano
Attorney, Agent, or Firm—Trask, Britt & Rossa

[57] ABSTRACT

A seal for a pressure chamber is provided. The seal is formed by welding a loop of rigid tubular material to the perimeter of the entry of a pressure chamber, conforming to the shape of the parameter. A side wall of this tubing is machined off to produce a continuous slot and a "C"-shaped channel running along the perimeter of the entry. Tubular gasket material is positioned in this "C"-shaped channel to extend partially out of the slot to seal against the door of the pressure chamber. A large diameter gasket may be used, and the interior of the gasket may be pressurized by a vent channel connected with the interior of the pressure chamber.

16 Claims, 2 Drawing Sheets

GASKET ASSEMBLY

BACKGROUND OF THE INVENTION

1. Field

The present invention provides a gasket assembly for a pressurized vessel, notably a sterilizer.

2. State of the Art

Pressurized vessels, such as sterilizers or autoclaves, typically require some form of gasket assembly for sealing the entry when the vessel is pressurized. A gasket channel is typically formed around the entry of the vessel into which is inserted a compressible resilient gasket. This gasket seals against the door when the door is closed.

Most such gasket assemblies include a solid bar of metal that is formed in the appropriate shape and welded to the entry. This bar is then machined to produce a groove to receive the gasket. Such grooves typically have a square cross-section. Another design forms a gasket channel by welding lengths of rectangular metal to the door.

Both of these designs waste expensive metal and require extensive machining. If welding is involved, a great deal of labor is required to weld together the structure forming the channel and to conform this structure to the shape of the entry. Another problem is inherent in the typically rectangular cross-section of the gasket channel. A gasket often tends to stick to the door after the vessel has been pressurized. The gasket thus tends to be pulled from the channel as the door is opened.

Some gasket assemblies employ an inflatable balloon gasket, which is essentially a resilient tube that is pressurized by some external mechanism. The seal with the door of the pressure chamber is enhanced by the pressure within the gasket. However, since these gaskets are relatively thin and pressurized externally, dangerous ruptures can occur.

The present invention provides a gasket assembly which is easily manufactured and which avoids many of the problems of the prior art.

SUMMARY OF THE INVENTION

The present invention provides a sealing capability for a pressure chamber of the type which is sealed by closing a door. A gasket is compressed at an interface between respective opposed surfaces of the door and the perimeter of the entry to the chamber. A rigid-walled tube is formed into an annular member configured to register with the perimeter, preferably entirely within the interface. A slot is provided in the annular member, thereby to form a gasket housing configured to receive a compressible annular gasket. The gasket housing is positioned between the opposed surfaces, integral with one of the surfaces and with the slot juxtaposed to the other of the surfaces. An annular gasket is inserted within the gasket housing. The gasket is sized with respect to the gasket housing such that upon insertion, the gasket protrudes from the slot, thereby constituting means for effecting a seal between the door and the entry when the door is closed.

In one embodiment, the annular member may be welded to the entry of the pressure chamber at its perimeter. The slot may be formed by machining off material from a wall of the annular member. This slot may be dimensioned with a width smaller than the tubular interior diameter of the resulting gasket housing.

In a preferred embodiment, the annular gasket is formed of a hollow tube. A pressure equalization channel may be formed between the tubular interior of the gasket and the interior of the pressure chamber.

The savings in material and labor provided by a method and assembly of the present invention are significant. A suitable gasket can be fabricated from readily available standard "O"-ring material, thereby avoiding the requirement for customized gasket construction. Large diameter gaskets are operable and are generally preferred because they tend to compensate for small surface deformities and thus provide a more trouble-free seal.

A circular arc or "C"-shaped channel holds the gasket in the groove so that it pulls away from the opposing surface when the door is opened. It is not necessary to provide expansion space for the gasket within the channel.

Highly resilient gaskets may be fabricated from thick-walled "O"-ring material. Such gaskets are generally useful without further modification, but characteristically effect a seal which is difficult to dislodge. A more satisfactory seal may be effected by a gasket having a relatively thinner sidewall, particularly if means are provided to equalize the pressure within the gasket to that within the chamber. Pressure equalization can be accomplished by means of a channel formed through the gasket sidewall. For example, a hole in the gasket channel may register with a corresponding hole in the gasket. A thin-walled "O"-ring requires much less clamping force at the door/entry interface to compress the gasket. The pressure directed to the inside of the "O"-ring increases the sealing effect of the interface-contacting surface of the gasket.

DETAILED DESCRIPTION OF THE ILLUSTRATED EMBODIMENT

Figure 1:
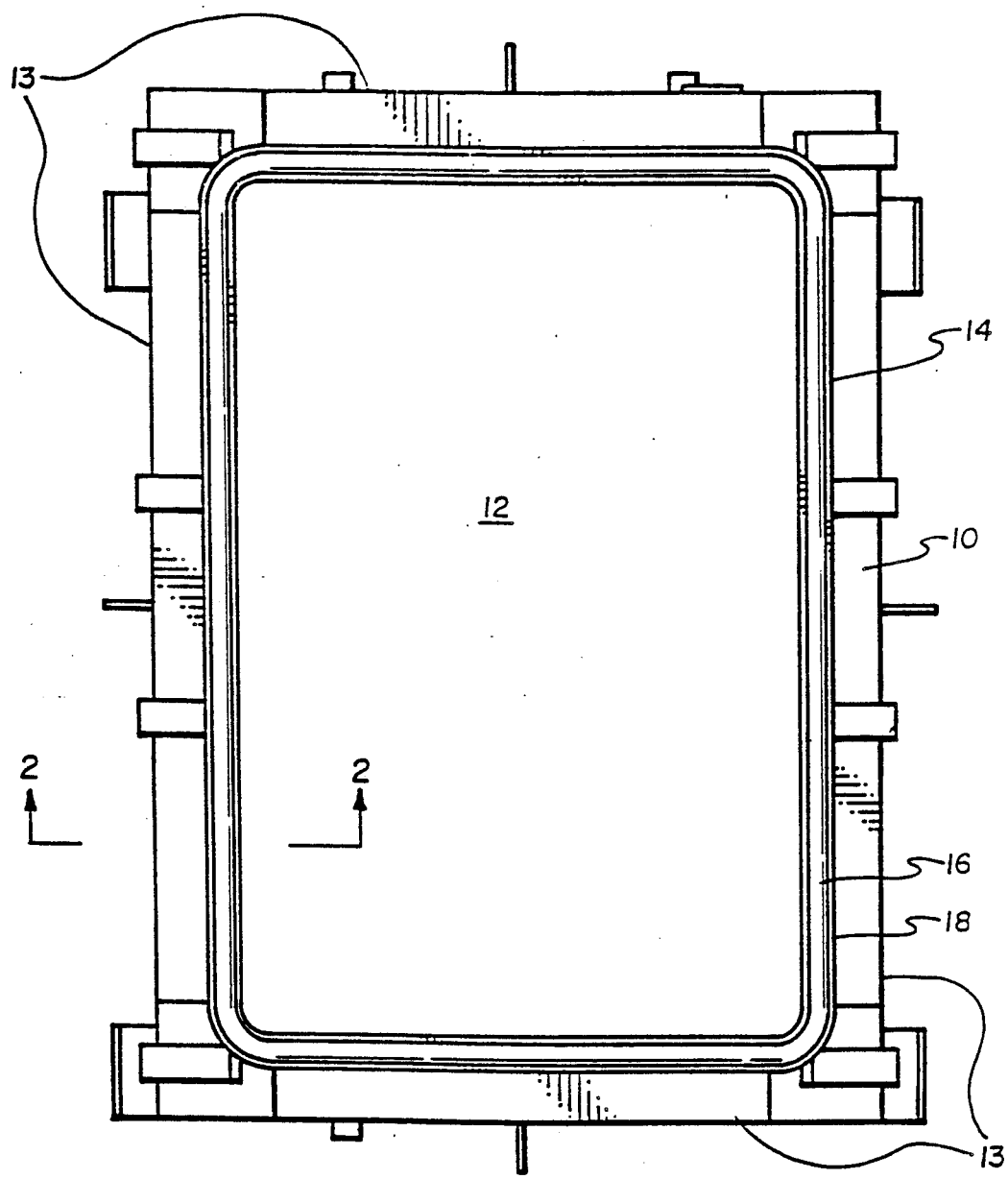
FIG. 1 is a front elevation view of the entry of a pressure chamber.
Figure 2:
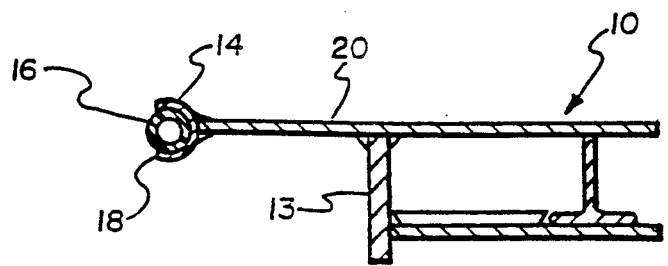
FIG. 2 is a partial section view of a gasket assembly taken along the section line indicated in FIG. 1 by 2—2 with the arrows rotated 90 degrees perpendicular to the plane of the drawing.

Referring to FIG. 1, pressure chamber 10 has an entry 12 with its perimeter defined by structural members 13, having a generally rectangular shape with the corners rounded as shown. (The door of the pressure chamber is not shown in FIG. 1.) A gasket assembly includes a gasket channel 14 and a tubular gasket 16. As shown, gasket channel 14 presents a slot opening 18 running along gasket channel 14 and conforming to the shape of the perimeter of the entry 12 of the pressure chamber 10. As shown in FIG. 2, gasket channel 14 is attached to chamber 10 at a rim 20 which projects from the structural members 13.

Figure 3:
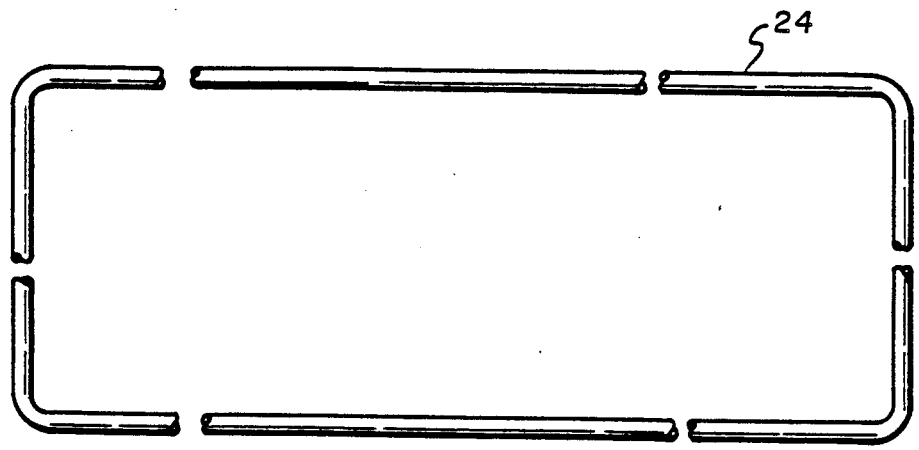
FIG. 3 is a front, partial section view of a section of tubing used to form a gasket channel of the invention.

Referring to FIG. 3, a length of standard tubing or pipe 24 is bent in the shape of the perimeter of the entry of the pressure chamber. This section of pipe 24 is then attached, for example, by welding, to the rim 20 (FIG. 2). After it is thus welded, a portion of the wall of tubing 24 is machined off, removing material corresponding to approximately one-third of the diameter of the tubing to produce the generally "C"-shaped section shown by member 14 in FIGS. 2, 4 and 5. A slot 18, having a typical width dimension denominated by the letter "A" in FIG. 5 is thus produced. Width "A" is smaller than the internal tubular diameter of channel 14 represented by dimension "B."

Pipe or tube 24 may be formed of various rigid pipe materials. A tubing material which has been found useful is Monel schedule 80 pipe; e.g., Monel 400 CD seamless and annealed pipe with a 1.315 inch outside wall diameter and a 0.179 inch wall thickness. When the pipe is bent to conform to the shape of the entry of the pressure chamber, internal mandrel forming is used to retain the diameter in the corners. The gasket 16 may be of any flexible gasket-type material, and is preferably tubular, as shown in FIG. 2. A representative material which has been found useful in practice is silicon compound no. S7511-5, Durometer Shore (A): 50±5 available from Web Seal, Incorporated, manufactured by Parker Seal Group.

Figure 4:
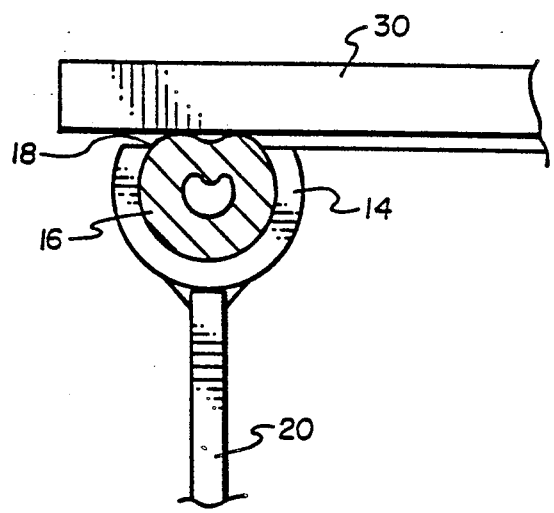
FIG. 4 is a schematic illustration of a gasket assembly of the invention.
Figure 5:
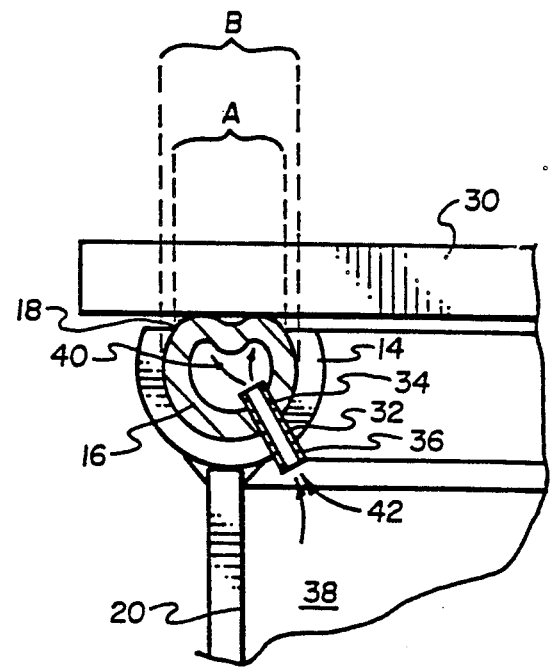
FIG. 5 is a schematic illustration of an alternative embodiment of a gasket assembly of the invention.

Referring to FIG. 4, a door 30 is shown as it would be closed on a pressure chamber provided with a gasket assembly of the invention. As shown, door 30 tends to compress gasket 16 to create a seal between door 30 and the entry 12 of the pressure chamber. After the pressurization process is complete, and door 30 is opened, there may be some tendency for gasket 16 to stick to door 30. However, because channel 14 is generally "C"-shaped, channel 14 holds gasket 16 in place, and dislodges it from door 30 as door 30 is opened.

According to an alternative embodiment illustrated by FIG. 5, a cylindrical hole 32 is formed in channel 14 and an associating cylindrical hole 34 is formed in gasket 16. A cylindrical roll pin tube 36 is inserted through holes 32 and 34 to provide a pressure equalization channel between the interior 38 of the pressure chamber and the interior 40 of gasket 16.

After door 30 has been closed, and as pressure builds up within the interior 38 of the pressure chamber, gas or vapor flows from the interior 38 of the chamber 10 to the interior 40 of the gasket 16 as shown by the arrows 42. This flow pressurizes the interior 40 of gasket 16 and creates a better seal between door 30 and the pressure chamber.

In the embodiment shown in FIG. 5, gasket 16 may have an outside diameter of approximately one inch and an inside diameter of approximately 0.6 inch. The tolerances on these dimensions is preferably approximately 0.015 of an inch. These internal and external diameters create a wall thickness of approximately 0.010 of an inch, which is a wall thickness considered to be relatively thin. This thin wall thickness is tolerable because of the pressurization of the inside of the gasket. If the inside of the gasket were not pressurized, a significantly thicker wall would be required to effect a suitable seal against door 30.

A one inch outside diameter gasket is considered to be a relatively large gasket for a pressure vessel of the type within contemplation. This large gasket size permits the acceptance of wider machining tolerances by compensating for otherwise unacceptable deformities in the interface between the door and the gasket.

Reference herein to details of the illustrated embodiments is not intended to limit the scope of the appended claims, which themselves recite those features considered important to the invention.

We claim:

1. A method of providing a sealing capability for pressure chamber of the type which is sealed by closing a door so that a gasket is compressed at an interface between respective opposed surfaces of said door and the perimeter of an entry to said chamber, comprising the steps of:
   forming a rigid-walled tube into an annular member configured to register with said perimeter entirely within said interface;
   positioning said annular member between said opposed surfaces, integral with one of said surfaces and with an exposed side juxtaposed to the other of said surfaces;
   machining off material from said exposed side of said annular member to form a slot therein, thereby to form a gasket housing configured to receive a compressible annular gasket; and
   inserting said annular gasket within said gasket housing, said gasket being sized with respect to said gasket housing such that upon insertion, said annular gasket protrudes from said slot, thereby constituting means for effecting a seal between said door and said entry when said door is closed.

2. A method according to claim 1 wherein a pressure equalization channel is formed between the interior of said gasket and the interior of said pressure chamber.

3. A method for providing a seal between a door and the perimeter of the entry of a pressure chamber, comprising the steps of:
   forming a closed loop of rigid tubing to generally correspond to the shape of said perimeter;
   attaching said rigid tubing to said entry at said perimeter;
   removing material from a wall of said rigid tubing to provide a continuous slot along said perimeter; and
   positioning a closed loop of compressible gasket material in the tubular interior of said rigid tubing to partially extend out of said continuous slot;
   wherein said slot and said gasket member are formed to provide a continuous loop of the partially extended portion of said compressible gasket material against which said door seals when said door is closed.

4. A method according to claim 3 where said rigid tubing is attached to said entry by means of welding.

5. A method according to claim 4 wherein said continuous slot is formed by machining material from a wall of said rigid tubing.

6. A method according to claim 5 wherein said slot is formed to have a width smaller than the interior tubular diameter of said rigid tubing.

7. A method according to claim 3 wherein said compressible gasket material is tubular.

8. A method according to claim 3 wherein a vent channel is formed to provide pressure equalization between the tubular interior of said compressible gasket material and the interior of said pressure chamber.

9. A seal for the door of a pressure chamber, comprising:
   a rigid gasket channel adapted between said door and the entry of said pressure chamber to form an annulus around the perimeter of said entry, said gasket channel having an open, continuous slot shaped for receiving a gasket to interface between said door and said entry;

a compressible tubular gasket configured to seat in said gasket channel and to partially extend out of said slot, said gasket constituting means for sealing between said door and said entry at said perimeter when said door is closed; and a pressure equalization channel formed from the interior of said tubular gasket to the interior of said pressure chamber.

10. A seal according to claim 9 wherein the walls of said tubular gasket are relatively thin.

11. A seal according to claim 9 wherein said gasket channel is formed of rigid tubing welded to said entry at said perimeter.

12. A seal according to claim 11 wherein said slot is formed by machining off material from a wall of said rigid tubing.

13. In a pressure chamber of the type which is sealed by a door closing against a gasket compressed at an interface between the respective opposed surfaces of the door and the perimeter of the entry to the chamber, the improvement comprising in combination:

a gasket channel member extending from attachment to one of said surfaces, said channel member being shaped as an approximately annular rigid tube from which material has been removed to form a continuous annular slot facing the other said surface;

a compressible annular gasket which is conformable to the shape of said channel member, having an outer diameter greater than the width of said slot and positioned to occupy the interior of said channel member and to protrude from said slot, thereby to provide a seal at said interface when said door is closed; and a pressure equalization channel formed to communicate between the interior of said gasket and the interior of said pressure chamber.

14. An improvement according to claim 13 wherein the walls of said gasket are relatively thin.

15. An improvement according to claim 13 wherein said attachment comprises a weld to said entry.

16. An improvement according to claim 13 wherein said tube has a cylindrical shape, and said slot has a width less than the diameter of said cylindrical tube.

* * * * *